March 20, 1956  S. D. POOL ET AL  2,738,638
STALK PICK-UP DEVICE FOR HARVESTERS
Filed May 20, 1953

INVENTORS.
Stuart D. Pool
Elof K. Karlsson

United States Patent Office 2,738,638
Patented Mar. 20, 1956

2,738,638

STALK PICK-UP DEVICE FOR HARVESTERS

Stuart D. Pool and Elof K. Karlsson, Moline, Ill., assignor to International Harvester Company, a corporation of New Jersey Application May 20, 1953, Serial No. 356,163

1 Claim. (Cl. 56—119)

This invention relates to a new and improved stalk pick-up device for harvesters.

Field traversing harvesting machines adapted to harvest and/or treat a stalk crop are oftentimes confronted with a large portion of the stalk crop lying down on the ground across and in adjacent rows of the crop. Certain stalk plants such as cane is planted and grows in longitudinally extending hills with valleys or trenches extending along and flanking each side of the hill. Cane stalks grow quite tall and are heavy making them easily susceptible to blowing down by wind or storms.

It is therefore a principal object of this invention to provide means to engage the down stalks and raise them from a position within the valleys or trenches to an upright position on the hill so that the harvesting machine may thereafter cut and/or treat the stalks as desired.

Another important object of this invention is the provision of stalk raising auger means having their lower ends contoured in a manner similar to the cross-sectional shape of valleys lying adjacent the hills carrying a stalk crop.

Another and further important object of this invention is to supply a stalk pick-up device with a pair of vertically disposed spaced apart auger members having at its lower end a downwardly and outwardly flaring portion and thence an inwardly and downwardly contracting portion in the form of cones, the lower portion of which snugly engages the trenches flanking the longitudinally extending stalk growing hill and thus providing for actively engaging down stalks lying within the trenches and to effect a lifting thereof to an upright position enabling the harvesting machine to act thereon.

Other and further important objects and advantages of this invention will become apparent from the disclosures in the following specification and accompanying drawings.

Figure 1:
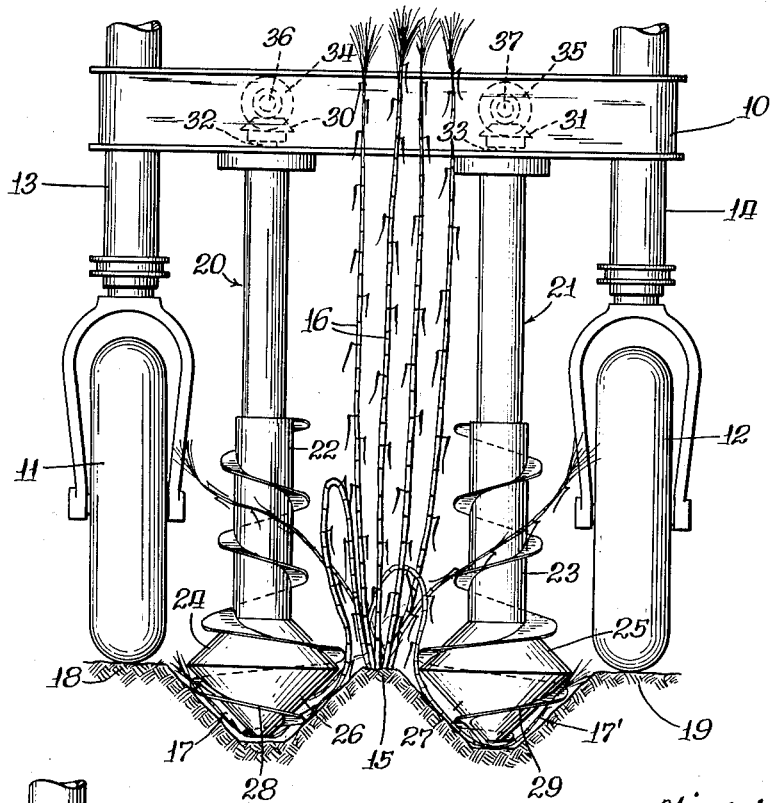
Figure 1 is a front elevational view of a part of a harvesting machine with the stalk elevating device of this invention mounted thereon.
Figure 2:
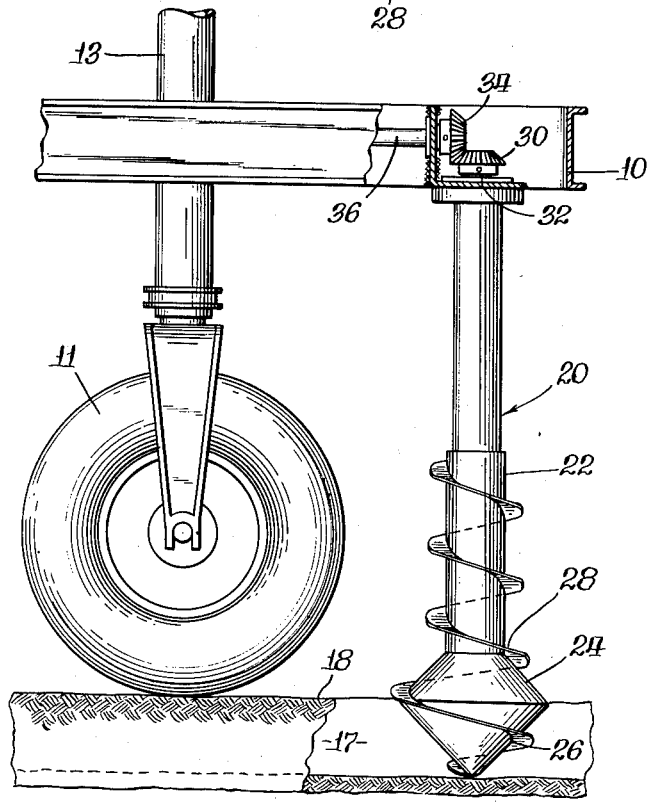
Figure 2 is a side elevational view of the device as shown in Figure 1 with parts broken away and in section.

The reference numeral 10 indicates generally a frame structure which is carried by dirigible wheels 11 and 12 at the forward end thereof. The dirigible wheels are each provided with vertically disposed members 13 and 14 which provide the connection between the frame structure and the wheels 11 and 12.

The cane harvester of this invention has been shown only in part inasmuch as our present concern lies with the means for picking up down stalks and raising them to a position to enable the machine to properly treat all of the cane stalks. Cane is planted in a longitudinally extending hill or row 15 and is shown at 16 thereon. Lying adjacent to and flanking the sides of the hill 15 are valleys or trenches 17 and 17'. These valleys, generally V-shape in cross section, provide the means for irrigating and holding the moisture in and around the cane roots in a manner conducive to efficient growth of the cane stalks. Outside of the valleys or trenches 17 and 17' there are spaced apart lands 18 and 19 in order to receive the harvester wheels 11 and 12 for stable operation of the harvesting machine through the cane fields. The lands 18 and 19 are substantially level with the intermediate hill 15. Wind and storms cause the cane stalks to be bent over resulting in the stalks lying across the rows or trenches and being depressed within the adjacent trenches. It is thus an important problem in the employment of a cane harvester to effect a thorough cleaning out of the trenches of the down stalks and place them in an upright position so that the machine might properly render its treatment on substantially 100% of the cane stalk grown.

A pair of relatively vertically disposed augers 20 and 21 are carried by the frame structure 10 in such a manner and relationship that the augers are laterally spaced apart a distance substantially equal to the spacing between the valleys or trenches 17 and 17' which flank the hill 15 carrying the stalk crop. The augers 20 and 21 have cylindrical core portions 22 and 23 for a substantial height thereof and at their lower ends there is included downwardly and outwardly flaring cone-shaped members 24 and 25 and continuing downwardly the bottoms of the augers have downwardly and inwardly contracting cone portions 26 and 27 which substantially mate with the V-shaped valleys 17 and 17' within which these lower portions of the augers depend. In other words, the inverted V-shaped cone contours of the lower ends of the augers are substantially identical to the contour of the shape of the trenches 17 and 17' and thus the walls lie closely parallel to one another. Screw flight members 28 and 29 are integrally mounted on the augers 20 and 21 over the longitudinal portions 22 and 23 and thence downwardly over the lower end portions 24 and 25, and 26 and 27.

In the operation of the harvesting machine of this invention the frame structure with its dirigible wheels at its forward end is adapted to pass through and over a field having cane growing in rows thereon. As previously explained, the cane is planted and grows in relatively longitudinally extending hill rows with flanking valleys or trenches to provide a means for effectively irrigating the cane crop. The stalk pick-up device of this invention is preferably disposed forwardly of the dirigible wheels 11 and 12 in order that the harvesting elements (not shown) on the machine of this invention will be able to reach and engage all of the cane stalks growing in any one row for substantially complete harvesting thereof. The contour stalk dividers or stalk raising mechanism includes the vertically disposed laterally spaced apart augers 20 and 21. These augers have their lower ends shaped to conform to the cross-sectional shape of the valleys between the rows of cane and thus enable the screw flight 28 and 29 thereon to effect a raising or lifting of all down stalks so that the stalks are disposed in an upright position substantially with and alongside those cane stalks which have not been blown over or otherwise knocked down. The augers 20 and 21 are caused to be rotated inwardly toward each other as viewed in Figure 1 so that the down stalks will be raised centrally between the valleys and up onto the hill where the stalks are initially grown. The means for driving the augers has been shown merely as constituting bevel gears 30 and 31 mounted on the upper ends of auger shafts 32 and 33. These bevel gears are driven by cooperative bevel gears 34 and 35 which are in turn driven by rotating shafts 36 and 37. The source of rotating the shafts 36 and 37 has not been shown.

Numerous details of construction such as the shape of the contour of the auger bottoms may be changed throughout a wide range without departing from the principles disclosed herein and we, therefore, do not propose limiting the patent granted hereon otherwise than as necessitated by the appended claim.

What is claimed is:

A pick-up device for row planted stalks comprising a frame structure, a pair of substantially vertically disposed augers carried by said frame structure, said augers being laterally spaced apart a distance sufficient to flank the row planted stalks, the augers having cylindrical cores and the lower ends of said auger cores flared outwardly and downwardly and thence contracted downwardly and inwardly, and a screw flight of substantially constant depth integrally mounted on said auger cores over the cylindrical portions and the lower flared and contracted ends thereof.

References Cited in the file of this patent

UNITED STATES PATENTS

| | | |
|---|---|---|
| 432,650 | Terman | July 22, 1890 |
| 1,773,672 | Grim | Aug. 19, 1930 |
| 2,603,319 | Dyche | July 15, 1952 |